United States Patent
Danziger et al.

(10) Patent No.: US 9,489,367 B2
(45) Date of Patent: Nov. 8, 2016

(54) SYSTEMS AND METHODS FOR MUTATIONS AND OPERATIONAL TRANSFORMS IN A COLLABORATIVE SPREADSHEET ENVIRONMENT

(71) Applicant: Google Inc., Mountain View, CA (US)

(72) Inventors: Joshua Ari Danziger, Metuchen, NJ (US); Amod Karve, Clifton, NJ (US); Yossi Kahlon, Montclair, NJ (US); Benjamin Wolfe Simon, New York, NY (US); Zachary Erik Lloyd, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 380 days.

(21) Appl. No.: 13/909,655

(22) Filed: Jun. 4, 2013

(65) Prior Publication Data

US 2015/0199327 A1     Jul. 16, 2015

Related U.S. Application Data

(63) Continuation of application No. 13/779,379, filed on Feb. 27, 2013.

(51) Int. Cl.
*G06F 17/24* (2006.01)
*G06Q 10/10* (2012.01)

(52) U.S. Cl.
CPC ........... *G06F 17/246* (2013.01); *G06Q 10/101* (2013.01)

(58) Field of Classification Search
CPC .............................. G06Q 10/00; G06F 17/246
USPC .......................................... 707/202; 715/220
See application file for complete search history.

(56) References Cited

U.S. PATENT DOCUMENTS

| | | | |
|---|---|---|---|
| 6,006,239 A | * | 12/1999 | Bhansali ............... G06F 17/246 |
| 6,393,437 B1 | | 5/2002 | Zinda et al. |
| 6,754,677 B1 | | 6/2004 | Cho et al. |
| 6,907,428 B2 | | 6/2005 | Fitzpatrick et al. |
| 7,058,663 B2 | | 6/2006 | Johnston et al. |
| 7,146,561 B2 | | 12/2006 | Bauchot et al. |
| 7,162,689 B2 | | 1/2007 | Demers et al. |
| 7,263,546 B1 | | 8/2007 | Kostadinov |

(Continued)

OTHER PUBLICATIONS

John Walkenbach, Excel 2010 Bible (Indianapolis, IN: Wiley Publishing, Inc., 2010) pp. 35, 65-66, 78-79, 110, 209 and 628.*

(Continued)

*Primary Examiner* — Frank D Mills
(74) *Attorney, Agent, or Firm* — Ropes & Gray LLP

(57) ABSTRACT

Mutations representing spreadsheet edit operations are received at a server from client computers of collaborators and also at a collaborator's client computer from other collaborators and the server. Different mutations may conflict, i.e., provide contradictory instructions on how a spreadsheet is to be edited. Techniques for representing sort operations, cut-and-paste operations, and operations to change cell properties as mutations, and operational transform techniques that can be used to resolve conflicts between such mutations, are disclosed herein. Further disclosed herein are techniques for identifying and processing computationally intensive types of mutations in a calculation thread which operates asynchronously with respect to a UI thread at a collaborator's client computer. The processing may include performing an operational transform on results of the calculation thread based on results obtained in the UI thread.

22 Claims, 9 Drawing Sheets

(56) References Cited

U.S. PATENT DOCUMENTS

| | | |
|---|---|---|
| 7,299,450 B2 | 11/2007 | Livshits et al. |
| 7,509,577 B2 | 3/2009 | Kuwata et al. |
| 7,526,750 B2 | 4/2009 | Andrews et al. |
| 7,593,943 B2 | 9/2009 | Clarke et al. |
| 7,617,234 B2 | 11/2009 | Davis et al. |
| 7,640,489 B2 | 12/2009 | Breuer |
| 7,668,873 B2 | 2/2010 | Davis et al. |
| 7,707,498 B2 | 4/2010 | Jones et al. |
| 7,730,394 B2 | 6/2010 | Davis et al. |
| 7,752,224 B2 | 7/2010 | Davis et al. |
| 7,941,399 B2 | 5/2011 | Bailor et al. |
| 7,945,590 B2 | 5/2011 | Davis et al. |
| 7,953,696 B2 | 5/2011 | Davis et al. |
| 7,953,794 B2 | 5/2011 | Clarke et al. |
| 8,023,437 B1 | 9/2011 | Chapweske et al. |
| 8,028,229 B2 | 9/2011 | Bailor et al. |
| 8,121,990 B1 | 2/2012 | Chapweske et al. |
| 8,275,974 B2 | 9/2012 | Voshell |
| 8,296,268 B2 | 10/2012 | Ingles et al. |
| 8,301,588 B2 | 10/2012 | Kannan et al. |
| 8,346,768 B2 | 1/2013 | Bailor et al. |
| 8,352,870 B2 | 1/2013 | Bailor et al. |
| 8,395,652 B1 | 3/2013 | Chapweske et al. |
| 8,412,773 B1 | 4/2013 | Chapweske et al. |
| 8,417,666 B2 | 4/2013 | Bailor et al. |
| 8,429,753 B2 | 4/2013 | Skaria et al. |
| 8,458,283 B1 | 6/2013 | Chapweske et al. |
| 8,484,292 B2 | 7/2013 | Spataro et al. |
| 8,484,561 B1 | 7/2013 | Lemonik et al. |
| 8,510,388 B2 | 8/2013 | Taylor |
| 8,510,399 B1 | 8/2013 | Byttow et al. |
| 8,516,050 B1 | 8/2013 | Chapweske et al. |
| 8,527,602 B1 | 9/2013 | Rasmussen et al. |
| 8,566,708 B1 | 10/2013 | Pereira et al. |
| 8,584,150 B2 | 11/2013 | Wallace |
| 8,639,762 B2 | 1/2014 | Rasmussen et al. |
| 8,656,290 B1 | 2/2014 | Greenspan et al. |
| 8,738,706 B1 | 5/2014 | Grieve et al. |
| 8,825,594 B2 | 9/2014 | Skaria et al. |
| 8,825,758 B2 | 9/2014 | Bailor et al. |
| 8,943,142 B1 * | 1/2015 | Simon .................... H04L 67/10 709/205 |
| 8,954,520 B2 * | 2/2015 | Triantos et al. ............. 709/206 |
| 8,983,901 B1 * | 3/2015 | Simon .................... G06F 17/246 707/608 |
| 9,021,386 B1 | 4/2015 | Rasmussen et al. |
| 9,026,935 B1 | 5/2015 | Rasmussen et al. |
| 9,047,266 B2 | 6/2015 | Chavoustie et al. |
| 9,069,747 B2 | 6/2015 | Ueberschaer et al. |
| 9,218,102 B1 | 12/2015 | Greenspan et al. |
| 9,298,688 B1 * | 3/2016 | Simon .................... G06Q 10/10 |
| 9,361,287 B1 * | 6/2016 | Simon .................... G06F 17/246 |
| 2003/0226105 A1 | 12/2003 | Waldau |
| 2006/0069696 A1 * | 3/2006 | Becker .................... G06F 17/246 |
| 2007/0233811 A1 | 10/2007 | Rochelle et al. |
| 2008/0028288 A1 * | 1/2008 | Vayssiere ............... G06F 17/246 715/219 |
| 2009/0112937 A1 | 4/2009 | Campbell et al. |
| 2009/0182763 A1 | 7/2009 | Hawking |
| 2010/0107014 A1 | 4/2010 | Shochat et al. |
| 2010/0174678 A1 | 7/2010 | Massand |
| 2011/0296317 A1 * | 12/2011 | Ishihara et al. ................ 715/753 |
| 2012/0198322 A1 * | 8/2012 | Gulwani ................ G06F 17/246 715/217 |
| 2013/0024731 A1 | 1/2013 | Shochat et al. |
| 2013/0063459 A1 | 3/2013 | Schneider et al. |
| 2013/0080502 A1 | 3/2013 | McColl et al. |
| 2014/0082470 A1 | 3/2014 | Trebas et al. |
| 2015/0193734 A1 * | 7/2015 | Karve .................... G06F 17/246 709/205 |
| 2015/0195375 A1 * | 7/2015 | Danziger ............... G06F 17/246 709/203 |
| 2015/0199326 A1 * | 7/2015 | Danziger ............. G06Q 10/101 715/219 |

OTHER PUBLICATIONS

John Walkenbach, Excel 2010 Bible (Indianapolis, IN: Wiley Publishing, Inc., 2010) pp. 65-66, 78-80, 110, 159, 209, 628, 633, 891.*
Chengzheng Sun et al., Operational Transformation for Orthogonal Conflict Resolution in Real-time Collaborative 2D Editing Systems (Seattle, WA: Achieving Harmony through Technology, Feb. 11-15, 2012) pp. 1391-1400.*
Find or replace text and numbers on a worksheet, <https://support.office.com/en-MY/article/Find-or-replace-text-and-numberson-a-worksheet-0e304ca5-ecef-4808-b90f-fdb42f892e90>, Nov. 2, 2010.

* cited by examiner

300

|    | A | B | C | D | E |
|----|---|---|---|---|---|
| 1  |   |   |   |   |   |
| 2  |   |   |   |   |   |
| 3  |   |   |   |   |   |
| 4  |   |   |   |   |   |
| 5  |   |   |   |   |   |
| 6  |   |   |   |   |   |
| 7  |   |   |   |   |   |
| 8  |   |   |   |   |   |
| 9  |   |   |   |   |   |
| 10 |   |   |   |   |   |
| 11 |   |   |   |   |   |
| 12 |   |   |   |   |   |
| 13 |   |   |   |   |   |
| 14 |   |   |   |   |   |

| A | Set A2 = 2 |
|---|---|
| B | Set A3 = 4 |
| C | Set B3 = A2+A3 |
| D | Set C10 = A2 x A3 |
| E | Set E9 = B3 + C10 |
| F | Set D1 = 3 |
| G | Set D12 = 7 |
| H | Set A3 = 5 |
| I | Delete Row 6 |
| J | Add Row 11 |
| K | Set E4 = 9 |
| L | Delete D12 |

|   | A |
|---|---|
| 1 | 3 |
| 2 | 9 |
| 3 | 6 |
| 4 | 8 |
| 5 | 2 |
| 6 | 1 |

Rows 1-3: 610
Rows 4-6: 620

Reorder Mutation

| Cell(s) Content | Destination Row | Origin Row |
|---|---|---|
| 1 | 1 | 6 |
| 2 | 2 | 5 |
| 3 | 3 | 1 |
| 6 | 4 | 3 |
| 8 | 5 | 4 |
| 9 | 6 | 2 |

Rows 1-3: 730
Rows 4-6: 740

Columns: 743, 746, 749

Sheet 1

|   | A | B |
|---|---|---|
| 1 | 1 | = A1 |
| 2 | = B1 | = Sum (A1:C1) |

925-1

Sheet 2

|   | A | B |
|---|---|---|
| 1 |   |   |
| 2 |   |   |
| 3 |   |   |

900-2

Sheet 1

|   | A | B |
|---|---|---|
| 1 |   |   |
| 2 | = Sheet2!B2 | = Sum (A1:C1) |

925-2

Sheet 2

|   | A | B |
|---|---|---|
| 1 |   |   |
| 2 | 1 | = A2 |
| 3 |   |   |

SYSTEMS AND METHODS FOR MUTATIONS AND OPERATIONAL TRANSFORMS IN A COLLABORATIVE SPREADSHEET ENVIRONMENT

CROSS REFERENCE TO RELATED DOCUMENTS

This application is a continuation application of U.S. patent application Ser. No. 13/779,379, entitled "SYSTEMS AND METHODS FOR MUTATIONS AND OPERATIONAL TRANSFORMS IN A COLLABORATIVE SPREADSHEET ENVIRONMENT," filed on Feb. 27, 2013, the disclosure of which is hereby incorporated by reference in its entirety.

FIELD

This disclosure relates generally to techniques for resolving conflicts that arise among edit commands entered by different users in a collaborative spreadsheet environment.

BACKGROUND

Conflicting edits of a spreadsheet may be received when the spreadsheet is accessed by multiple collaborators. For example, a first user may select to perform an edit of a first region of cells of the spreadsheet and a second user may perform an edit of a second region of cells of the spreadsheet overlapping the first region. In order for all collaborators to have a common (i.e., consistent) spreadsheet, such conflicts should be resolved.

SUMMARY

In a collaborative network environment, mutations representing spreadsheet edit operations are received at a server from computers of various collaborators. Mutations are also received at each collaborator's client computer from other collaborators and the server. In each location, mutations are queued in a sequence to be applied to the spreadsheet and a first mutation and a second mutation present in the queue may conflict. As used in the disclosure herein, a first mutation and a second mutation are said to conflict if they provide contradictory instructions on how the spreadsheet is to be edited or else require that the second mutation be interpreted and/or modified in view of the first mutation before the second mutation is applied to the spreadsheet to produce a desired command or result. Such conflicts can arise with respect to sort operations, cut-and-paste operations, operations to change cell properties, and other types of operations. Accordingly, this disclosure relates to techniques for representing spreadsheet operations as mutations and to operational transform techniques for resolving conflicts among such mutations.

In the collaborative network environment, a collaborator may enter multiple edits of a spreadsheet, each of which is represented by a respective mutation and applied locally to the spreadsheet at the collaborator's client computer. Mutations involving analytic functions are identified as computationally intensive and hence processed in a calculation thread which operates asynchronously with respect to a UI thread at the collaborator's client computer. Further, operational transforms are used to modify results of the calculation thread based on results obtained in the UI thread. As used herein, the term UI thread refers to a "main" thread of a process. That is, the UI thread is an initial (i.e., first) thread used to execute a given process and the UI thread spawns any other (secondary) threads employed by the process. Further, in some implementations, the UI thread handles system calls in connection with other threads in use by a process. The terms UI thread and main thread are used interchangeably in this disclosure.

Accordingly, disclosed herein are techniques for updating a spreadsheet based on user inputs. Specifically, a first mutation from a first source location specifying a function to be applied to data of the spreadsheet is received, where the first mutation comprises one or more source-row-to-destination-row mappings. Further, a second mutation from a second source location specifying a data edit mutation to be applied to the spreadsheet is received, where the second mutation has a higher priority than the first mutation. The second mutation is applied to the spreadsheet, and an operational transform is performed on the first mutation based on the second mutation to generate a modified first mutation. The modified first mutation is applied to the spreadsheet.

Also disclosed herein are techniques for updating a property of a cell in a collaborative spreadsheet. Specifically, a first mutation is received from a first source, where the first mutation comprises a value of a first cell property of a cell in the spreadsheet. Further, a second mutation is received from a second source, where the second mutation comprises a value of a second cell property of the cell in the spreadsheet. It is determined that the first cell property and the second cell property belong to a common property field, and an operational transform is performed based on the first mutation and the second mutation to generate a modified mutation. A property of the cell in the spreadsheet is updated based on the modified mutation.

Further disclosed herein are techniques for updating a spreadsheet based on user inputs. Specifically, a first user input is received specifying an analytic function to be applied to data of the spreadsheet and a second user input is received specifying a data edit operation to be performed on the spreadsheet. Further, the first user input is processed in a calculation thread, where the processing comprises applying the analytic function to the data of the spreadsheet to produce first mutation results. While the first user input is processed in the calculation thread, the second user input is processed in a UI thread to produce second mutation results, and the second mutation results are applied to the spreadsheet to update the spreadsheet. In response to a determination that the processing of the first user input is complete, an operational transform is performed on the first mutation results based on the second mutation results to obtain modified first mutation results, and the modified first mutation results are applied to the spreadsheet.

BRIEF DESCRIPTION OF THE DRAWINGS

Further features of the disclosed techniques, their nature and various advantages, will be apparent upon consideration of the following detailed description, taken in conjunction with the accompanying drawings, in which like reference characters refer to like parts throughout, and in which:

FIG. 3 depicts an illustrative portion of an spreadsheet that may be stored on a cloud computing system in accordance with an implementation;

FIG. 4 depicts an illustrative global mutation log in accordance with an implementation;

FIG. 6 illustrates a single column of a spreadsheet in accordance with an implementation;

FIG. 7 illustrates a sort (reordering) mutation corresponding to the single column of FIG. 6 in accordance with the implementation depicted in FIG. 6;

FIG. 9 illustrates an operational transform of a cut-and-paste mutation based on a higher priority set-cell mutation in accordance with an implementation;

DETAILED DESCRIPTION

Figure 1:
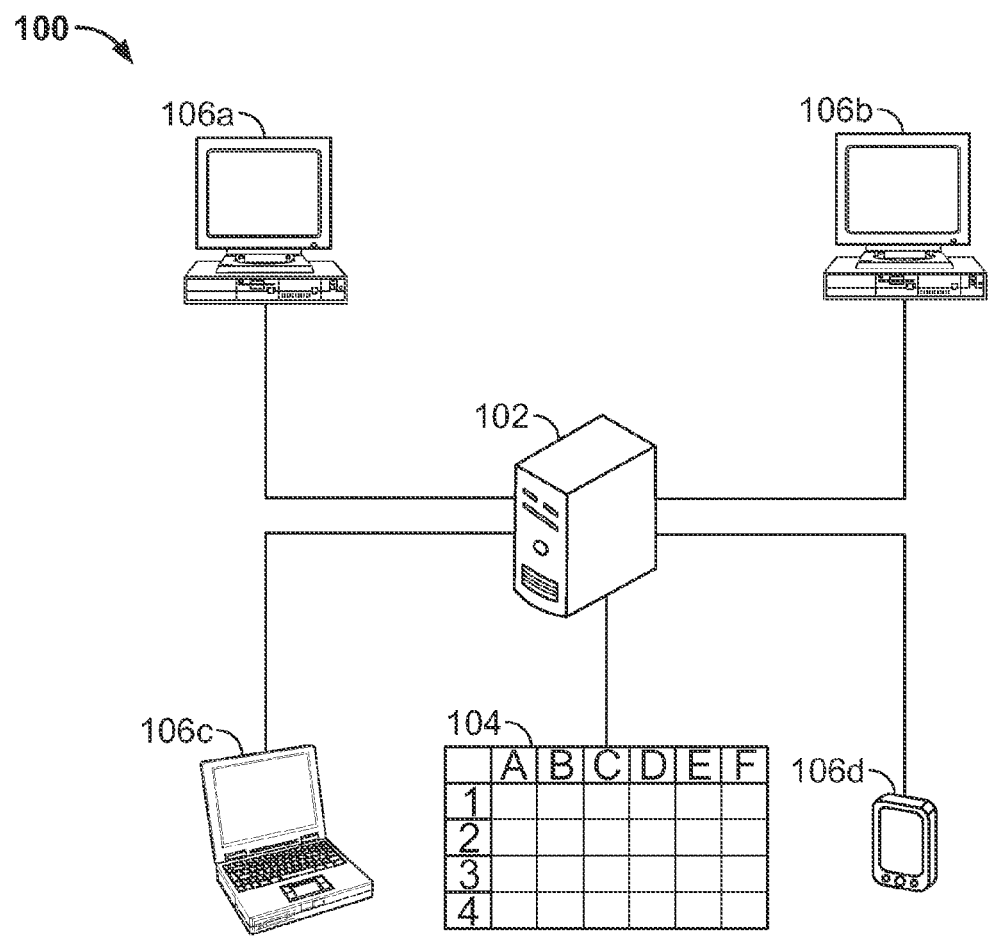
FIG. 1 depicts a client-server system, where the server supports a cloud computing system for storing spreadsheets and other files in accordance with an implementation.

The systems and methods described herein relate to a cloud computing system capable of delivering a spreadsheet to multiple remote client users and for implementing edits (also referred to herein as "mutations") to the spreadsheet made by the client users. In some implementations, the systems and methods disclosed herein are implemented by a cloud computing system similar or identical to that described in copending, commonly-assigned U.S. patent application Ser. No. 13/735,377, which was filed on Jan. 7, 2013, entitled "DYNAMICALLY SIZING CHUNKS IN A PARTIALLY LOADED SPREADSHEET MODEL", the disclosure of which is hereby incorporated by reference herein in its entirety.

Some aspects of a representative cloud computing system on which the disclosed systems and methods may be implemented are described next. In such a cloud computing system, a global mutation log is associated with a spreadsheet and stored on a server. The global mutation log records mutations made by users to the spreadsheet. When a user on a client computer requests the spreadsheet from the server, the server applies the mutations stored in the global mutation log to the spreadsheet and sends the spreadsheet, or a portion of the spreadsheet (referred to as a "chunk" of the spreadsheet), to the client computer.

The user on the client computer may make local edits of the spreadsheet. These edits are also represented by mutations that are stored in a pending queue on the client computer and that are sent in batches from the client computer to the server. The pending queue includes a sent section for mutations that have been sent to the cloud computing system and an unsent section for mutations that have not been sent to the cloud computing system. Mutations made by collaborators of the user of the client computer are sent to the client computer and placed in a collaborator queue.

The server or a local client computer may include edits that "conflict" in its queue of edits that are to be applied to its copy of the spreadsheet. For example, the server may receive a first edit of a first part of the spreadsheet from a collaborator A and a second edit of a second part of the spreadsheet from a collaborator B, where the first and second parts of the spreadsheet overlap and specify different operations. Continuing the example, edit A may specify numerical values for data cells in the first part of the spreadsheet while edit B may specify numerical values for data cells in the second part of the spreadsheet. A conflict occurs for a cell included in both the first and second parts of the spreadsheet when the numerical value for the cell specified by the edit A is different than the numerical value for the cell specified by the edit B.

Operational transforms are used to resolve such conflicts and ensure consistency of results regardless of the order in which the mutations are applied. In some instances, an unsent pending user mutation in the pending queue is operationally transformed by the client computer against the collaborator mutations before being sent to the cloud computing system. In other instances, the client computer sends a pending user mutation to the cloud computing system without performing an operational transform on the pending user mutation, and the cloud computing system itself performs the operational transform on the pending user mutation when applying the pending user mutation to the spreadsheet. In either of these cases, the client computer may send the cloud computing system a revision number associated with the mutation. The cloud computing system then correctly transforms the mutation against any other collaborator mutations that have been applied to the cloud computing system's copy of the spreadsheet having a later revision number before applying the (operationally transformed) mutation to the spreadsheet.

These and other features may be implemented using a system as shown in FIG. 1. In particular, FIG. 1 depicts a client-server system, where the server supports a cloud computing system for storing spreadsheets and other files in accordance with an implementation. System 100 includes one or more servers 102 which collectively provide a cloud computing system for storing files such as spreadsheet file 104. System 100 also includes a number of client computers 106a through 106d which connect to servers 102 through a remote network, such as the Internet. Each one of client computers 106a through 106d may be a desktop computer, laptop computer, mobile device, tablet, or any other computing device capable of connecting with servers 102. The remote network connection may be a wired or wireless Internet connection, local area network (LAN), wide area network (WAN), Wi-Fi network, Ethernet, or any other type of known connection.

Figure 2:
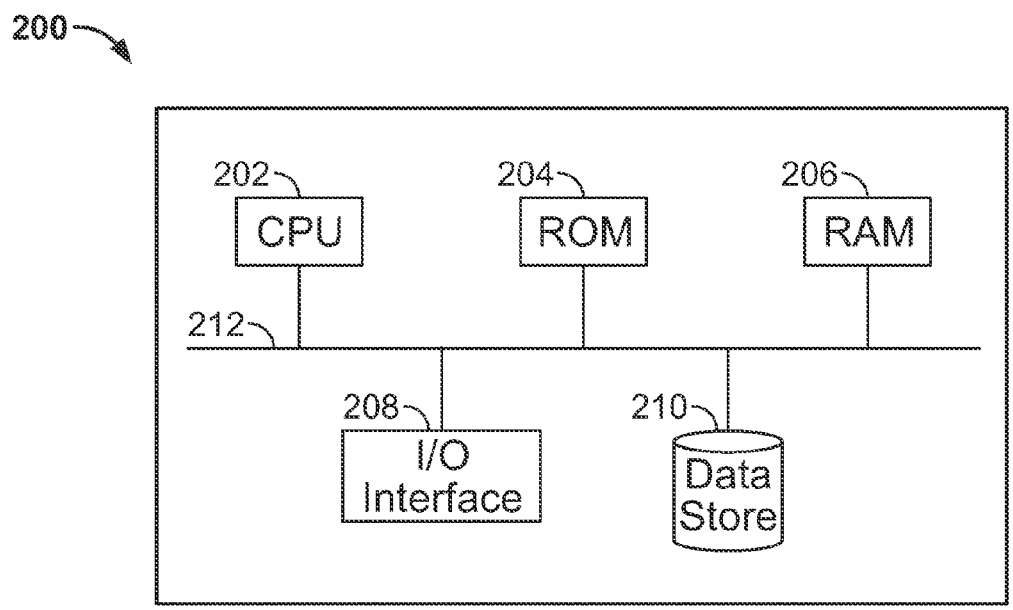
FIG. 2 depicts an exemplary client computer in accordance with an implementation.

FIG. 2 depicts an exemplary client computer in accordance with an implementation. The client computer 200 includes a central processing unit (CPU) 202, read only memory (ROM) 204, random access memory (RAM) 206, input/output interface 208, data store 210, and bus 212. Client computer 200 may have additional components that are not illustrated in FIG. 2. Bus 212 allows the various components of client computer 200 to communicate with each other. Input/output interface 208 allows client computer 200 to communicate with other devices, such as one or more servers hosting the cloud computing system. Data store 210 may store, among other things, code for a web browser for interacting with a cloud computing system and displaying and editing files stored on the cloud computing system. Data store 210 also stores one or more portions of a spreadsheet loaded from the cloud computing system.

Data store 210 for storing files and programs on client computer 200 may be implemented using non-transitory computer-readable media. Examples of suitable non-transitory computer-readable media include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and readable, once-writeable, or re-writeable CD-ROM and DVD-ROM disks.

FIG. 3 depicts an illustrative portion of an spreadsheet that may be stored on a cloud computing system in accordance with an implementation. Spreadsheet 300 includes rows 1 through 14 and columns A through E. The cloud computing system may represent the entire spreadsheet 300 using one or more chunks, where each chunk represents a range of cells in the spreadsheet. A spreadsheet file may include a number of individual sheets, each having its own tab, arranged in a "workbook" structure. Chunks may be created for each sheet within the spreadsheet file.

A global mutation log is associated with the spreadsheet. FIG. 4 depicts an illustrative global mutation log 400 in accordance with an implementation. The global mutation log applies to all chunks of a spreadsheet, so only one log is stored per spreadsheet. Global mutation log 400 stores mutations, or edits, that all users with write access to the spreadsheet send to the cloud computing system, in the order in which they are received. These edits may be to set the value of cells, delete cell values, enter formulae into cells, cut, copy or paste values, add or delete rows and columns, or any other operation permissible in an electronic spreadsheet. For example, global mutation log 400 stores a number of set value commands, such as "Set A2=2" for mutation A, "Set A3=4" for mutation B, and "Set B3=A2+A3" for mutation C. Global mutation log 400 may also store row addition and deletion mutations, such as "Delete Row 6" for mutation I and "Add Row 11" for mutation J. Other mutations not shown in FIG. 4 may also be stored in global mutation log 400.

Asynchronous Spreadsheet Formula Calculation with Operational Transform

When a user of a client computer edits a spreadsheet, the edits are represented by mutations that are applied locally to the spreadsheet at the client computer (in addition to being sent, in batches, from the client computer to the server). If mutations are processed serially in a main (or UI) thread, then mutations that are computationally intensive (e.g., a mutation involving a mathematical formula that applies to large regions of the spreadsheet) will consume a large amount of computational resources at the client computer and delay application of later-queued mutations to the spreadsheet. The serial processing of mutations in this manner would result in a sluggish or non-responsive user experience.

As an alternative to the serial processing of mutations as described above, computationally intensive types of mutations may be identified and processed in a calculation thread which operates asynchronously with respect to a UI thread, and operational transforms may be used to modify results of the calculation thread based on results obtained in the UI thread. In an implementation, mutations involving analytic functions are identified as computationally intensive and thus processed in the calculation thread asynchronously with respect to a UI thread.

As a preliminary illustrative example, suppose that a local user accesses a sheet of a spreadsheet in which a value of 10 is present in cell A1 and that the user enters the formula "=A1+100" in cell A2. Because the formula "=A1+100" is an analytic function, calculation of the formula is processed in a calculation thread that operates separately and asynchronously from the UI thread used to process all other user mutations (i.e., those not involving analytic functions). Further, while the calculation is processed by the calculation thread (assume, for the purposes of the example, that the formula takes a long time to compute), a user may perform additional data edit operations to the spreadsheet that are processed by the UI thread.

A suitable operational transform is used to modify the result of the calculation thread based on a result of the UI thread so as to ensure consistent results, if necessary. For example, suppose that the user inserts a row at row index one that is processed by the main thread while the calculation thread processes the mutation corresponding to entry of the formula "=A1+100." In this case, the result of the calculation thread that was to be assigned to cell A2 should instead be assigned to cell A3 instead (accounting for the row insertion). Thus, when the calculation of the calculation thread finishes and produces a mutation corresponding to the analytic function, the mutation is operationally transformed based on the insert row mutation output by the UI thread, so that the result of the analytic function is placed in the correct location of the spreadsheet (i.e., in cell A3 instead of in cell A2, in the current example). This process is formalized in process 500, below.

Figure 5:
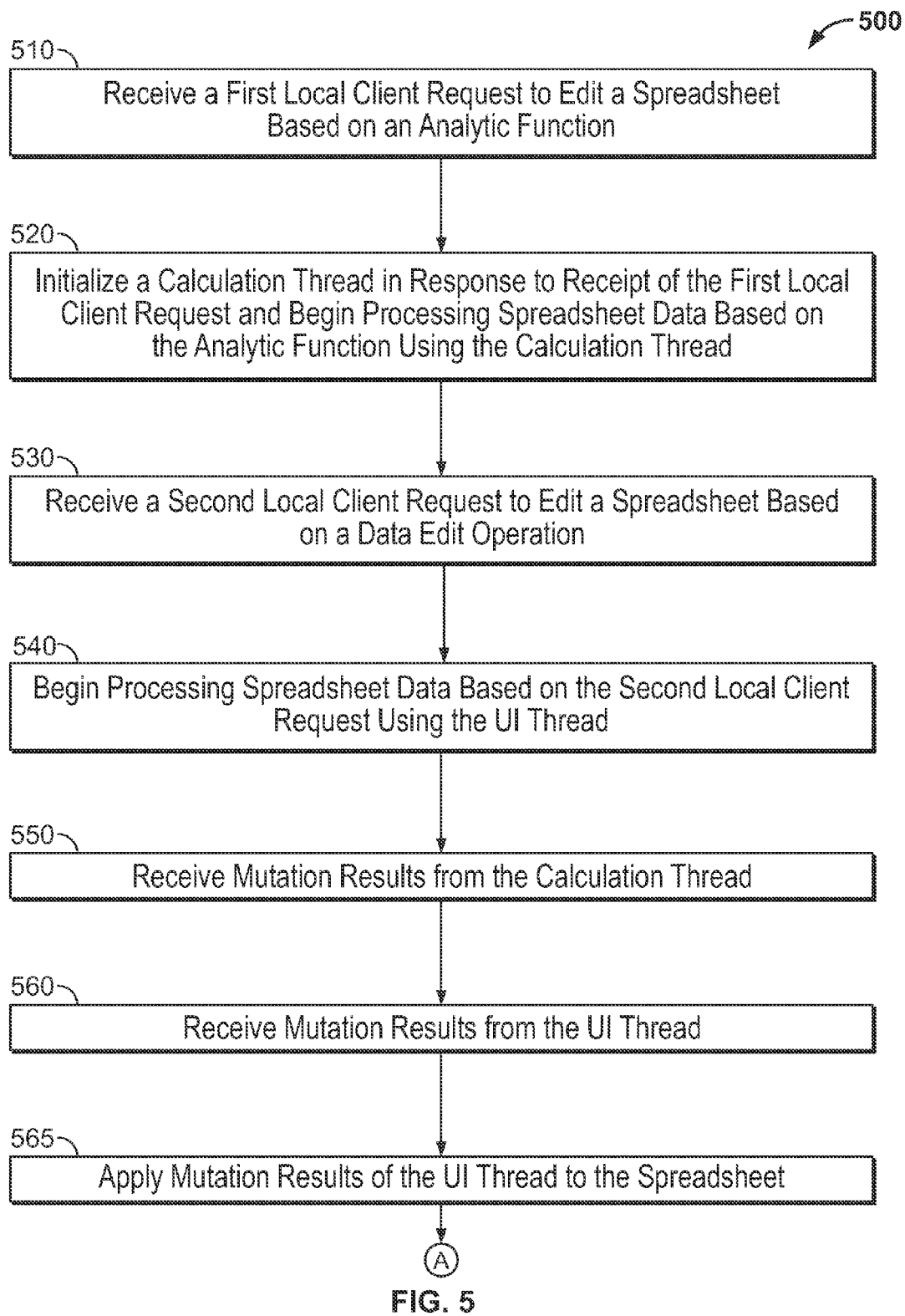
FIG. 5 illustrates a process for asynchronously processing mutations and applying operational transforms to results of the processing in accordance with an implementation.
Figure 5:
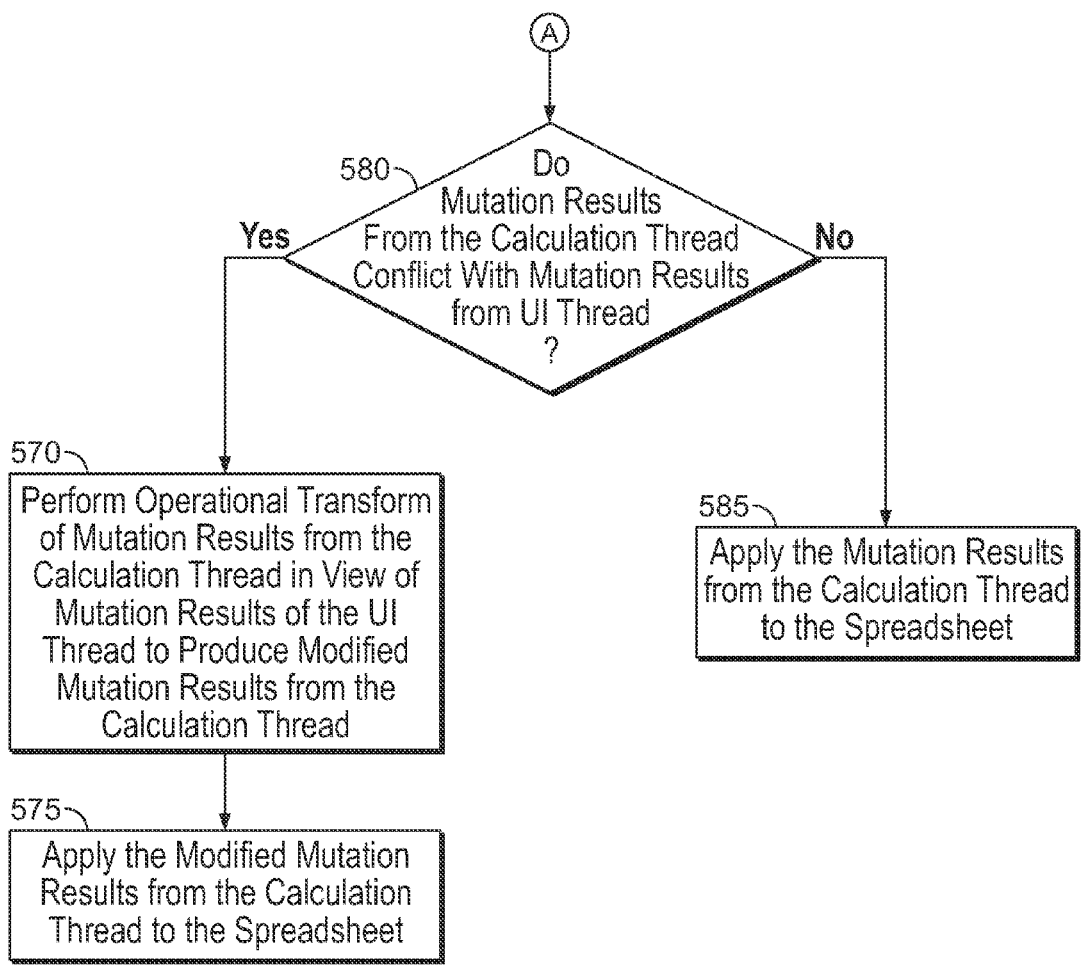

FIG. 5 illustrates a process for asynchronously processing mutations and applying operational transforms to results of the processing in accordance with an implementation. At 510, a first local client request is received at the client computer (e.g., at any one of client computers 106a through 106d of FIG. 1) to edit a spreadsheet based on an analytic function. For example, the command "set B3=A2+A3" or "set A3=5" may be received at 510.

At 520, the client computer initiates a calculation thread in response to receipt of the first local client request and begins to process spreadsheet data based on the analytic function using the calculation thread. The calculation thread is separate from a UI (or main) thread used by the client computer to process spreadsheet data and the calculation thread operates asynchronously with respect to the UI thread.

At 530, a second local client request is received, where the second local client request is to edit a spreadsheet based on a data edit operation. A data edit operation encompasses any edit operations possible on the spreadsheet, including operations to insert or delete rows or columns, change a font size of data displayed in a cell or cells, and change a background or text color associated with a cell or cells.

At 540, the client computer begins processing spreadsheet data based on the second local client request using the UI thread. At 550, the client computer receives the mutation result from the calculation thread and, at 560, the client computer receives the mutation result from the UI thread. As would be understood by one of ordinary skill, based on the disclosure and teachings herein, the mutation results from the calculation thread may be received before, after, or at the same time as results from the UI thread, and in general the time at which results are received from each thread depends on the computational complexity of the data being processed by that thread.

At 565, results from the UI thread are applied to the copy of the spreadsheet on the local client computer and a corresponding mutation is stored in a pending queue on the client computer. At 580, it is determined if the mutation result from the UI thread conflicts with the mutation result from the calculation thread (e.g., if the two results dictate inconsistent modifications to common spreadsheet cells). If there is no conflict in the mutations, then process 500 proceeds to 585, where the results from the calculation thread are applied to the copy of the spreadsheet on the local client computer and a corresponding mutation is stored in a pending queue on the client computer.

On the other hand, if there is a conflict in the mutation results, then process 500 proceeds to 570, where an operational transform is performed on the mutation results from the calculation thread in view of the mutation results of the UI thread to produce modified mutation results for the calculation thread. As would be understood by one of ordinary skill, based on the disclosure and teachings herein, the nature of the operational transform employed at 580 depends on a type associated with each of the first client request and the second client request. Operational transforms for particular types of operations (e.g., sort operations, cut-and-paste operations, and operations to change cell properties) are described elsewhere in this disclosure. At 575, the modified mutation results from the calculation thread are applied to the spreadsheet.

Mutations and Operational Transforms for Sorting Data in a Collaborative Spreadsheet Conflicting mutations arise in relation to sorting spreadsheet data in a collaborative spreadsheet environment. As explained next, these conflicts may be resolved by first specifying a structure to represent sort mutations and then specifying suitable techniques for performing an operational transform on the sort mutations. In designing mutations and operational transforms for data sort commands, a couple of points are to be noted. First, conflicting mutations produced by different users are received at local client computers (in addition to at a server). Second, because client computers typically maintain in memory at any one time only chunks of a spreadsheet, rather than an entire spreadsheet, the design described herein allows a client computer to apply a sorting mutation received from another user or the server without having to access any additional chunks of the spreadsheet other than those that are already available to the client computer.

In particular, sort mutations are represented as a reordering of rows and also include cell values of the data that is to be sorted. FIGS. 6 and 7 together illustrate aspects of a sort mutation (which is also referred to as a "reorder mutation" herein) in accordance with an implementation. In particular, FIG. 6 illustrates a single column ("A") of a spreadsheet 600 in accordance with an implementation. Further, FIG. 7 illustrates a sort (reordering) mutation corresponding to the single column of FIG. 6 in accordance with the implementation depicted in FIG. 6. Suppose that a local client request is received to sort the column labeled "A" in ascending order. The sort mutation 750 represents this sort command. In particular, the sort mutation 750 includes three columns— column 743 stores the cell content of each origin row (i.e., rows 1-6) of the spreadsheet 600, while columns 746 and 749 store a mapping between origin and destination rows implied by the sort command. It should be noted that FIGS. 6 and 7 together illustrate a simplified case in which only a single column of data is sorted. In general, a sort command applies to data spanning N columns. Thus, in the general case, column 743 would store, for each row, the contents of all columns corresponding to that row included in the sort.

As described above, in an implementation, each collaborator on a spreadsheet may have a unique set of chunk(s) of the spreadsheet stored on his or her respective client computer. The structure of sort mutation 750 nevertheless enables each client computer to apply a sorting mutation received from another collaborator or the server without having to access any chunks of the spreadsheet other than those that are already available locally on the client computer. Specifically, by storing the actual cell contents subject to sorting (e.g., as stored in column 743 of illustrative reordering mutation 750), each client computer is able to perform sorting operations based on a received row reordering mutation without a need to read from or write to any other chunk of the spreadsheet.

This point is illustrated by FIGS. 6 and 7. Referring back to these figures, assume that the spreadsheet 600 includes two chunks, chunk 610 and chunk 620. Suppose further that collaborator A maintains a copy of chunk 610 (containing rows 1-3) and not chunk 620, and that collaborator B maintains a copy of chunk 620 (containing rows 4-6) and not chunk 610. Because the reordering mutation 750 stores cell contents subject to sorting, the reordering mutation 750 allows a collaborator to perform sorting even without access to chunk(s) of the spreadsheet within which origin rows are located. For example, based on the reordering mutation 750, collaborator A is able to update its local spreadsheet at rows 1 and 2 with data that, prior to the sort, was located in origin rows 6 and 5, respectively, i.e., data values that were not originally a part of A's local spreadsheet chunk 610. Similarly, collaborator B is able to update its local spreadsheet at rows 4 and 6 with data that, prior to the sort, was located in origin rows 3 and 2, respectively, i.e., data values that were not originally in B's local spreadsheet chunk 620.

Figure 8:
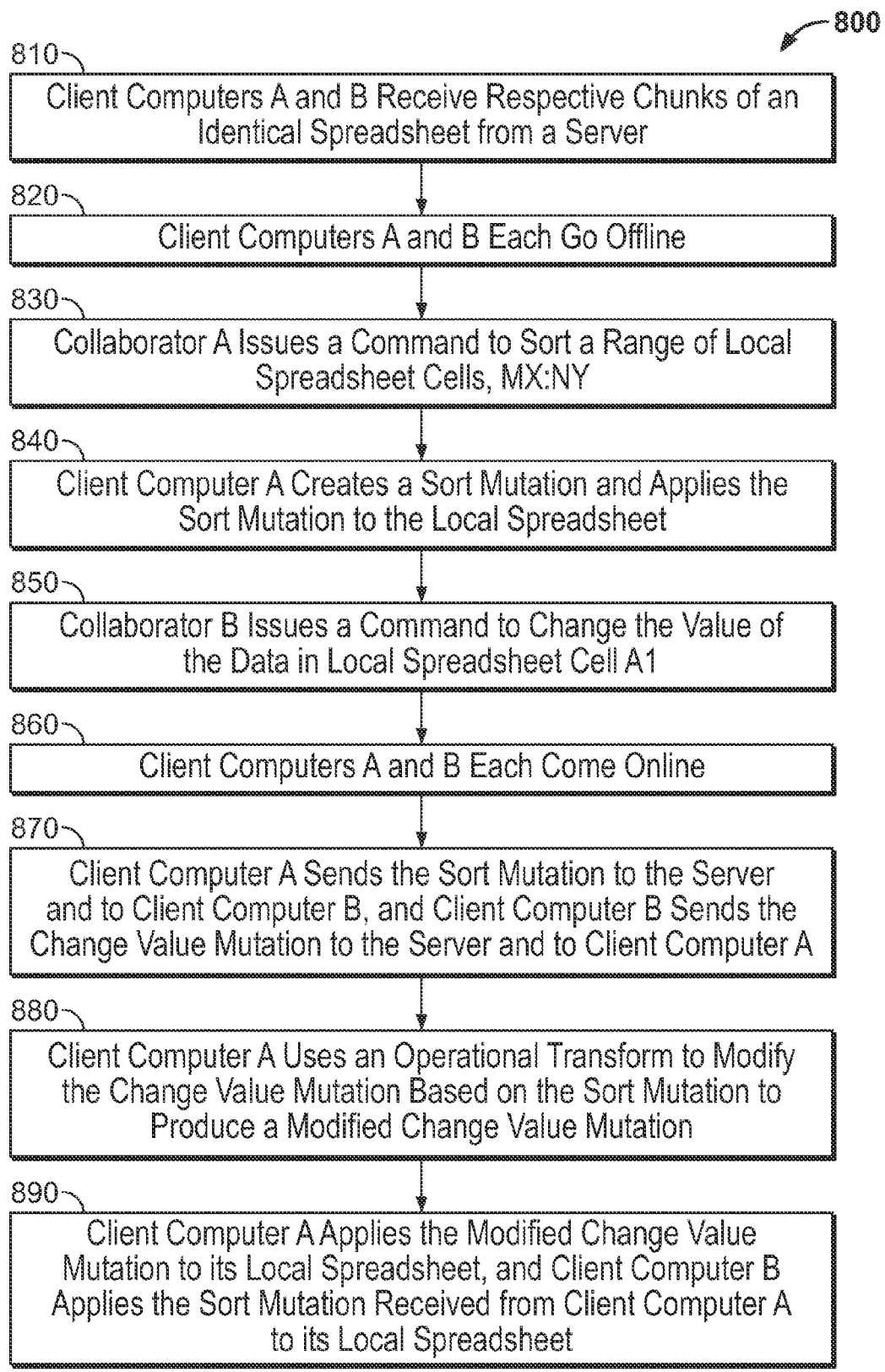
FIG. 8 illustrates a workflow including a sort mutation and an operational transform of a sort mutation in accordance with an implementation.

FIG. 8 illustrates a workflow including a sort mutation and an operational transform of a sort mutation in accordance with an implementation. At 810 of process 800, the client computers of two collaborators, A and B, receive chunk(s) of a spreadsheet from a server. The client computer of collaborator A and collaborator B will be referred to as client computer A and client computer B, respectively. The chunk(s) received by the client computers A and B may be the same or may be different. At 820, client computers A and B each go offline with respect to the server and each other. At 830, collaborator A issues a command to sort a rectangular range of cells denoted by MX:NY, i.e., the range of cells from row M to row N and from column X to column Y, inclusive.

At 840, client computer A creates a sort mutation based on the locally-received command. For example, if the received sort mutation applies to column A of the spreadsheet 600 depicted in FIG. 6, then client computer A creates the sort mutation 750 depicted in FIG. 7. Further, at 840, the client computer A applies the sort mutation to its local copy of the spreadsheet and places the sort mutation in its pending queue so that the row-reordering mutation may be sent to the server and client computer B at a later time when client computer A comes online.

At 850, collaborator B issues a command to change a value of data in cell A1 of the spreadsheet. At 860, client computers A and B each come online. At 870, client computer A, upon coming online, sends the sort mutation to the server and to client computer B. Similarly, client computer B, upon coming online, sends the change value mutation to the server and to client computer A.

At 880, client computer A performs an operational transform on the change value mutation received from client computer B based on its own sort mutation to produce a modified change value mutation. That is, the change value mutation received from client computer B is applied to cell A1 on collaborator B's copy of the spreadsheet, the operational transform performed by client computer A maps this to the equivalent row on collaborator A's copy of the spreadsheet in view of the sort mutation. At 890, client computer A applies the modified change value mutation to its local spreadsheet. Further, client computer B applies the sort mutation received from collaborator A directly to its spreadsheet without any need for an operational transform.

That is, at 890, client computer B does not perform an operational transform of the sort mutation in view of the change value mutation but rather applies the sort mutation directly to its local copy of the spreadsheet. This is because the particular row reorderings that define a sort operation are not affected by a change to the underlying content of data in any cell of any row. As such, the fact that client computer A did not have knowledge of the change value mutation (issued by collaborator B) at the time that client computer A issued the sort mutation does not alter the sort command that is to be applied to the local spreadsheet at client computer B.

Mutations and Operational Transformations for Cut-and-Paste

Conflicting mutations arise in relation to cut-and-paste operations in a collaborative spreadsheet environment. These conflicts may also be resolved using operational transforms. In particular, specified herein are both a cut-and-paste mutation structure and a technique for applying operational transforms to cut-and-paste mutations. In some implementations, cut-and-paste mutations are represented as a mapping from source cells to destination cells in a spreadsheet. For example, with reference to spreadsheet 300 of FIG. 3, suppose that a collaborator issues a command to cut cells A1:A5 and paste these cells at location B6:B10 of the spreadsheet. The corresponding mutation is a data structure containing the mapping Rows: 1→6, 2→7, 3→8, 4→9, 5→10, and
Columns: 1→2.

Represented in a table format for clarity of presentation, the cut-and-paste mutation is represented as

| Rows | Columns |
|---|---|
| 1 → 6 | 1 → 2 |
| 2 → 7 | 1 → 2 |
| 3 → 8 | 1 → 2 |
| 4 → 9 | 1 → 2 |
| 5 → 10 | 1 → 2 |

This cut-and-paste mutation may then be operationally transformed based on other spreadsheet commands, such as commands to insert row(s), delete row(s), insert columns(s), delete column(s), and set cell content values.

In specifying a cut-and-paste operation, a user specifies, e.g., highlights with a mouse cursor, a region of one or more destination cells in a spreadsheet where source cells are to be pasted. In doing so, it is possible that a user may designate a number of destination cells that is different from a number of source cells (referred to as a "mismatched" designation of cells). A user may make a mismatched designation of cells either accidentally or, especially if the user is familiar with how the spreadsheet handles such mismatches, on purpose. In some implementations, a mismatched designation of cells is handled as follows.

In some implementations, if a number of destination cells selected is fewer than a number of source cells selected, then the number of destination cells is automatically expanded to be of the same size as the number of source cells. For example, if a user selects five cells, A1:A5, for cutting in a cut-and-paste operation but highlights only two cells, C4 and C5, for pasting, the paste operation would nevertheless paste the contents of the cells A1:A5 into cells C4:C8. A cut-and-paste mutation corresponding to these user actions would reflect this automatic expansion of destination cells. Thus, the cut-and-paste mutation would be represented as

| Rows | Columns |
|---|---|
| 1 → 4 | 1 → 3 |
| 2 → 5 | 1 → 3 |
| 3 → 6 | 1 → 3 |
| 4 → 7 | 1 → 3 |
| 5 → 8 | 1 → 3 | despite the fact that the user elected to paste only into two cells, cells C4 and C5.

On the other hand, if a number of destination cells selected is larger than a number of source cells selected in a cut-and-paste operation, then, in some implementations, source cells are "tiled" to fit the entire region of selected destination. In some implementations, tiling is only performed (i) if a number of destination rows and destination columns are each a common integer multiple of a number source rows and columns, respectively, (ii) there is one source row and one destination row and a number of destination columns is an integer multiple of a number of source columns, or (iii) there is one source column and one destination column and a number of destination rows is an integer multiple of a number of source rows. For example, if a user designates three cells A1:A3 for a cut and designates twelve cells B1:C6 for paste, the number of destination rows and destination columns are each a common integer multiple (i.e., the integer multiple two) of the number source rows and columns. Accordingly, the source cells would be "tiled" four times, with an instance of the contents of cells A1:A3 pasted in each of cell regions B1:B3, B4:B6, C1:C3, and C4:C6. Thus, the cut-and-paste mutation would be represented as

| Rows | Columns |
|---|---|
| 1 → 1 | 1 → 2 |
| 2 → 2 | 1 → 2 |
| 3 → 3 | 1 → 2 |
| 1 → 4 | 1 → 2 |
| 2 → 5 | 1 → 2 |
| 3 → 6 | 1 → 2 |
| 1 → 1 | 1 → 3 |
| 2 → 2 | 1 → 3 |
| 3 → 3 | 1 → 3 |
| 1 → 4 | 1 → 3 |
| 2 → 5 | 1 → 3 |
| 3 → 6 | 1 → 3 |

In some implementations, the spreadsheet program includes functionality to ensure that the behavior described above in response to a mismatched designation of cells conforms to a user's intention (e.g., to prevent against the possibility that the user accidentally designated a mismatch of cells and/or to ensure that the user knows how mismatches are handled by the spreadsheet program). For example, in some implementations, the user is notified of the mismatch and prompted to confirm the consequential behavior of the mismatch (i.e., the tiling or expanding cells, as described above).

One characteristic of the mutation representation of cut-and-paste operations described above is that it is straightforward to break large (and therefore, potentially computationally complex) mutations into a number of smaller mutations. For example, the mutation above may be decomposed into four separate and smaller mutations as follows

| Rows | Columns |
|---|---|
| 1 → 1 | 1 → 2 |
| 2 → 2 | 1 → 2 |
| 3 → 3 | 1 → 2 |

| Rows | Columns |
|---|---|
| 1 → 4 | 1 → 2 |
| 2 → 5 | 1 → 2 |
| 3 → 6 | 1 → 2 |

| Rows | Columns |
|---|---|
| 1 → 1 | 1 → 3 |
| 2 → 2 | 1 → 3 |
| 3 → 3 | 1 → 3 |

| Rows | Columns |
|---|---|
| 1 → 4 | 1 → 3 |
| 2 → 5 | 1 → 3 |
| 3 → 6 | 1 → 3 |

Clearly, a large mutation may be broken into smaller mutations according to a variety of different formats. For example, instead of four submutations of three rows per mutation, as in the example above, an alternate scheme would include six submutations of two rows per mutation. Further, there is no requirement that all submutations include the same number of rows per mutation.

As described above in relation to sort mutations, client computers typically maintain in memory at any one time only chunks of a spreadsheet, rather than an entire spreadsheet. Accordingly, in some implementations, the design described herein allows a client computer to apply a cut-and-paste mutation received from another user or the server without having to access any additional chunks of the spreadsheet other than those that are already available to the client computer. Specifically, in these implementations, a cut-and-paste mutation includes data values that are to be pasted in addition to the mapping from source cells to destination cells in a spreadsheet described above. For example, with reference to spreadsheet 300 of FIG. 3, suppose that a collaborator issues a command to cut cells A1:A5 and paste these cells at location B6:B10 of the spreadsheet. The corresponding mutation is a data structure containing the mapping Rows: 1→6, 2→7, 3→8, 4→9, 5→10, Values: $v_1, v_2, v_3, v_4, v_5$, and Columns: 1→2, where $v_1$ through $v_5$ are the values of the data stored at spreadsheet cells A1 through A5, respectively, just prior to the cut-and-paste operation. Accordingly, each client computer is able to perform a paste function of a cut-and-paste operation based on a received cut-and-paste mutation without a need to read from or write to any other chunk of the spreadsheet.

Operational transforms of cut-and-paste mutations based on the insertion and deletion of rows are handled as follows. When transforming a cut-and-paste mutation against a higher priority insert row mutation that intersects source cells only, a copy of the inserted row is not included in the destination cells. As an example, suppose that a user command is received to insert a row 2. The cut-and-paste mutation

| Rows | Columns |
|---|---|
| 1 → 4 | 1 → 3 |
| 2 → 5 | 1 → 3 |
| 3 → 6 | 1 → 3 | would be transformed to

| Rows | Columns |
|---|---|
| 1 → 5 | 1 → 3 |
| 3 → 6 | 1 → 3 |
| 4 → 7 | 1 → 3 |

Thus, the first, third, and fourth rows are mapped to destination rows, but the (newly inserted) second row is not.

When transforming a cut-and-paste mutation against a higher priority delete row mutation that intersects source cells only, a copy of the deleted row is not included in the destination cells. For example, suppose a command is received to delete a row 2. The cut-and-paste mutation Ml, above, would be transformed to

| Rows | Columns |
|---|---|
| 1 → 4 | 1 → 3 |
| 3 → 5 | 1 → 3 |

Thus, the (deleted) second source row is not copied to the destination, although the first and third source rows are.

When transforming a cut-and-paste mutation against a higher priority insert row mutation that intersects destination cells only, the paste is performed "around" the inserted row. For example, suppose a command is received to insert a row 5. The cut-and-paste mutation Ml, above, would be transformed to

| Rows | Columns |
|---|---|
| 1 → 4 | 1 → 3 |
| 2 → 6 | 1 → 3 |
| 3 → 7 | 1 → 3 |

Thus, data is pasted into the third column of the fourth, sixth, and seventh rows, but not into the third column of the fifth row (i.e., the newly inserted row).

When transforming a cut-and-paste mutation against a higher priority delete row mutation that intersects destination cells only, the paste operation omits pasting source data that was intended for the deleted row. For example, suppose a command is received to delete a row 5. The cut-and-paste mutation Ml, above, would be transformed to

| Rows | Columns |
|---|---|
| 1 → 4 | 1 → 3 |
| 2 → EMPTY | 1 → 3 |
| 3 → 6 | 1 → 3 |

Thus, as indicated by the qualifier "EMPTY," the source data in column 1 of row 2 is not pasted anywhere as this data was intended to be pasted into the (since deleted) row 5. Although not pasted, in some implementations, the contents of the source at column 1 and row 2 are nevertheless stored in a memory in case the contents are needed for a later operational transform or mutation.

When transforming a cut-and-paste mutation against a set-cell command (i.e., a command setting or changing a formula assigned to a cell in a spreadsheet), the set-cell command is updated only when the set-cell command solely references cells located within the region of cells that are cut. FIG. 9 illustrates such an operational transform of a cut-and-paste mutation based on a higher priority set-cell mutation for the case that cells A1 and B1 of sheet 1 are cut-and-paste to cells A2 and B2, respectively, of sheet 2. Specifically, sheet 1 900-1 and sheet 2 925-1 depict formulas entered into cells of (portions of) a sheet 1 and a sheet 2, respectively, of a given spreadsheet prior to a cut-and-paste of cells A1 and B1 of sheet 1 into cells A2 and B2, respectively, of sheet (in FIG. 9, a blank cell indicates that no formula has been entered into that cell). Similarly, sheet 1 900-2 and sheet 2 925-2 depict formulas effective for cells of (portions of) the sheet 1 and the sheet 2, respectively, of the spreadsheet after the cut-and-paste operation.

The changes in the cell formulas before and after the cut-and-paste operation illustrate the rule that a set-cell command is updated only when the set-cell command exclusively references cells located within the region of cells that is cut. First, because the formula for cell A1 of sheet 1 is a constant value, it does not reference any cells at all, and thus is not changed when moved to cell A2 of sheet 2. On the other hand, the formula initially in cell B1 of sheet 1, i.e., "=A1," is a formula that refers exclusively to cells located within the region of cells that are cut-and-paste (i.e., the region A1:B1). Accordingly, the set-cell command is updated to indicate the new location of the cell to which it refers. That is, the formula is updated from "=A1" in sheet 1 to "=A2" in sheet 2.

Next consider the formulas in cells A2:B2, which are not moved as part of the cut-and-paste operation. Applying the same rule to these cells, the set-cell command stored in cell A2 of sheet 1 is not updated. This is because the set-cell command, i.e., "SUM(A1:C1)," refers to at least one cell outside of the cut-and-paste region (i.e., the cell C1, which is outside the region A1:B1). Therefore, the entire set-cell command of cell B2 of sheet 1 remains unchanged by the cut-and-paste operation, as shown by comparing this cell in sheet 1 900-1 and sheet 1 900-2. On the other hand, the formula of cell A2 of sheet 1 is updated as part of the cut-and-paste operation because this set-cell command refers exclusively to cells (actually, a single cell, cell B1) located within the region of cells that are cut-and-paste (i.e., the region A1:B1). This update is seen by comparing the formula entered into cell A2 in sheet 1 900-1 and sheet 1 900-2.

Figure 10:
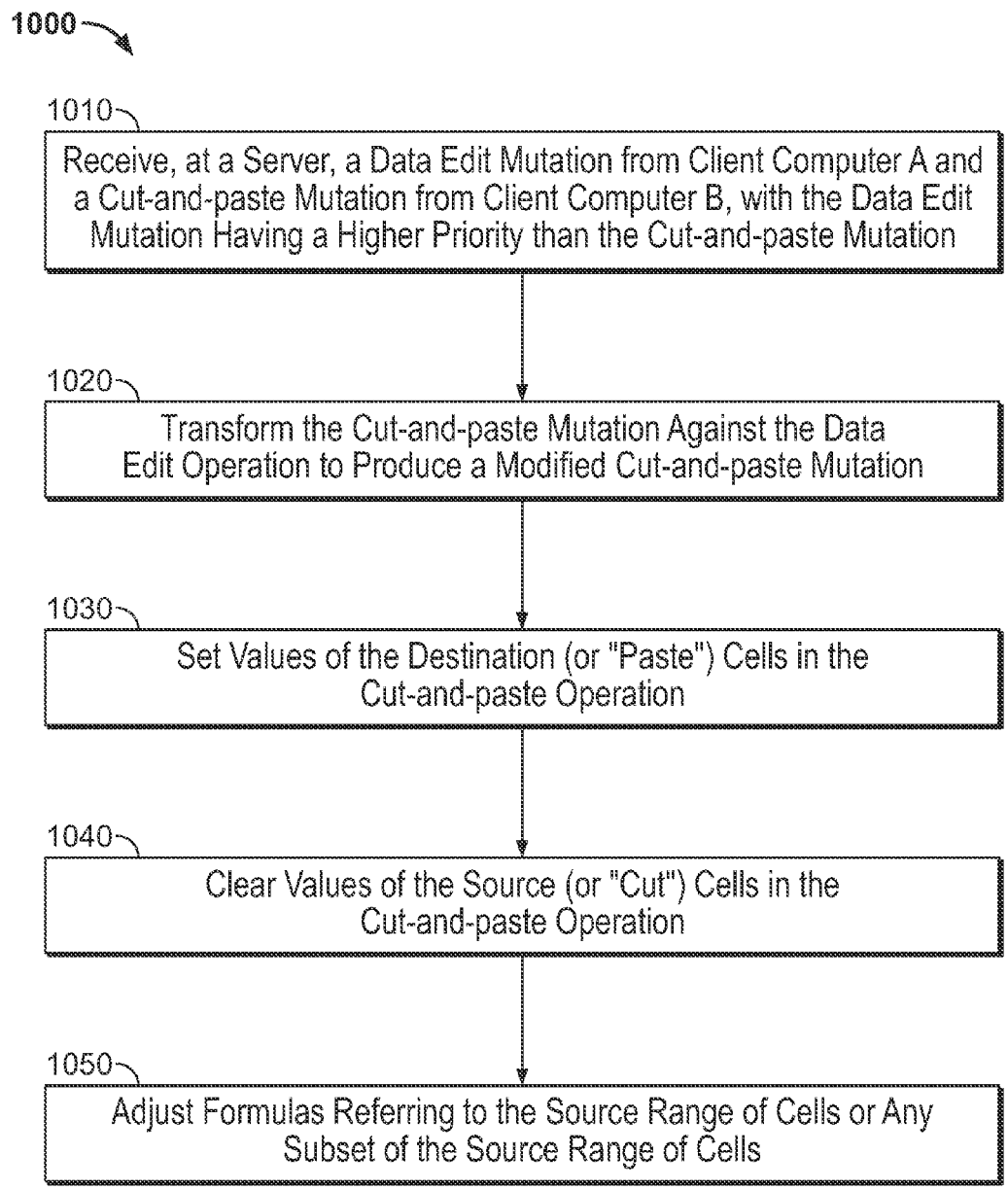
FIG. 10 illustrates a workflow in which a cut-and-paste mutation is processed at a server in a collaborative spreadsheet environment in accordance with an implementation.

FIG. 10 illustrates a workflow 1000 in which a cut-and-paste mutation is processed at a server in a collaborative spreadsheet environment in accordance with an implementation. At 1010, a data edit mutation is received at a server from a client computer of a collaborator A and a cut-and-paste mutation is received from a client computer of a collaborator B. Further the data edit operation has a higher priority than the cut-and-paste operation. In an implementation, the data edit operation corresponds to one of an insert row or column, delete row or column, or a set-cell command applicable to one or more cells of the spreadsheet.

At 1020, the cut-and-paste mutation is transformed against the data edit operation to produce a modified cut-and-paste mutation. In particular, the operational transform is performed using some of techniques described above, depending of the type of data edit mutation (e.g., whether an insert row or column, delete row or column, or a set-cell mutation) received from client computer A. At 1030, the values of the destination (or "paste") cells are set based on the modified cut-and-paste mutation. At 1040, values of the source (or "cut") cells are cleared. At 1050, any formulas referring to the source range of cells or any subset of the source range of cells are adjusted according to the rule, described above, that the set-cell command is updated only the set-cell command exclusively references cells located within the region of cells that is cut.

Generated Mutations for Structured Data Models

Conflicting mutations also arise in relation to user commands to edit properties of a cell (or cells) in a collaborative spreadsheet environment, and these conflicts may also be resolved using operational transforms. In particular, specified herein are both a cell property mutation structure and a technique for applying operational transforms to cell property mutations.

Each cell in a spreadsheet is associated with a large number of cell properties. For example, in an illustrative implementation, a portion of a data structure storing properties for a single cell is expressed as follows

```
message Format {
    optional Background background;
    optional Borders borders;
    optional TextFormat cell_text_format;
    optional HorizontalAlign horizontal_align;
    optional VerticalAlign vertical_align;
    optional WrapStrategy wrap_strategy;
    optional NumberFormat number_format
},
``` where Background refers to properties of a cell background, Borders refers to properties of cell borders, TextFormat refers to the formatting of text displayed in the cell, VerticalAlign refers to a vertical alignment of data in a cell, WrapStrategy refers to whether and how text wraps within a cell, and NumberFormat refers to a formatting of numerical data, if present, within the cell. Further, some or all of the fields of the data structure shown above may include one or more levels of nested subfields. For example, in an implementation, the borders field has subfields for a top border, bottom border, left border, and right border. Each of these four subfields, in turn, includes its own subfields for style, width, and color.

As disclosed herein, there are generally two types of mutations related to changes to cell properties. A "merge" mutation is a mutation in which a user selects to edit a specific cell property or properties. Accordingly, to remain compact, a merge mutation includes data representations for only those fields of the structured data model that are to be edited and omits data represents for all other fields. For example, a change to a background color of a cell would be represented by a merge mutation of the form cell_properties.format.background=< . . . >, while a change to a background and foreground color of a cell would be represented by a merge mutation of the form cell_properties.format.{
  background=< . . . >,
  foreground=< . . . >}.

The second type of mutation is a "replace" mutation. The replace mutation is associated with cut-and-paste commands. Specifically, when a user pastes cells into a destination, the destination cells inherit all the cell properties (among those specified in the structured data model) of the source cell. Thus, a "replace" mutation includes every field of the structured data model.

Figure 11:
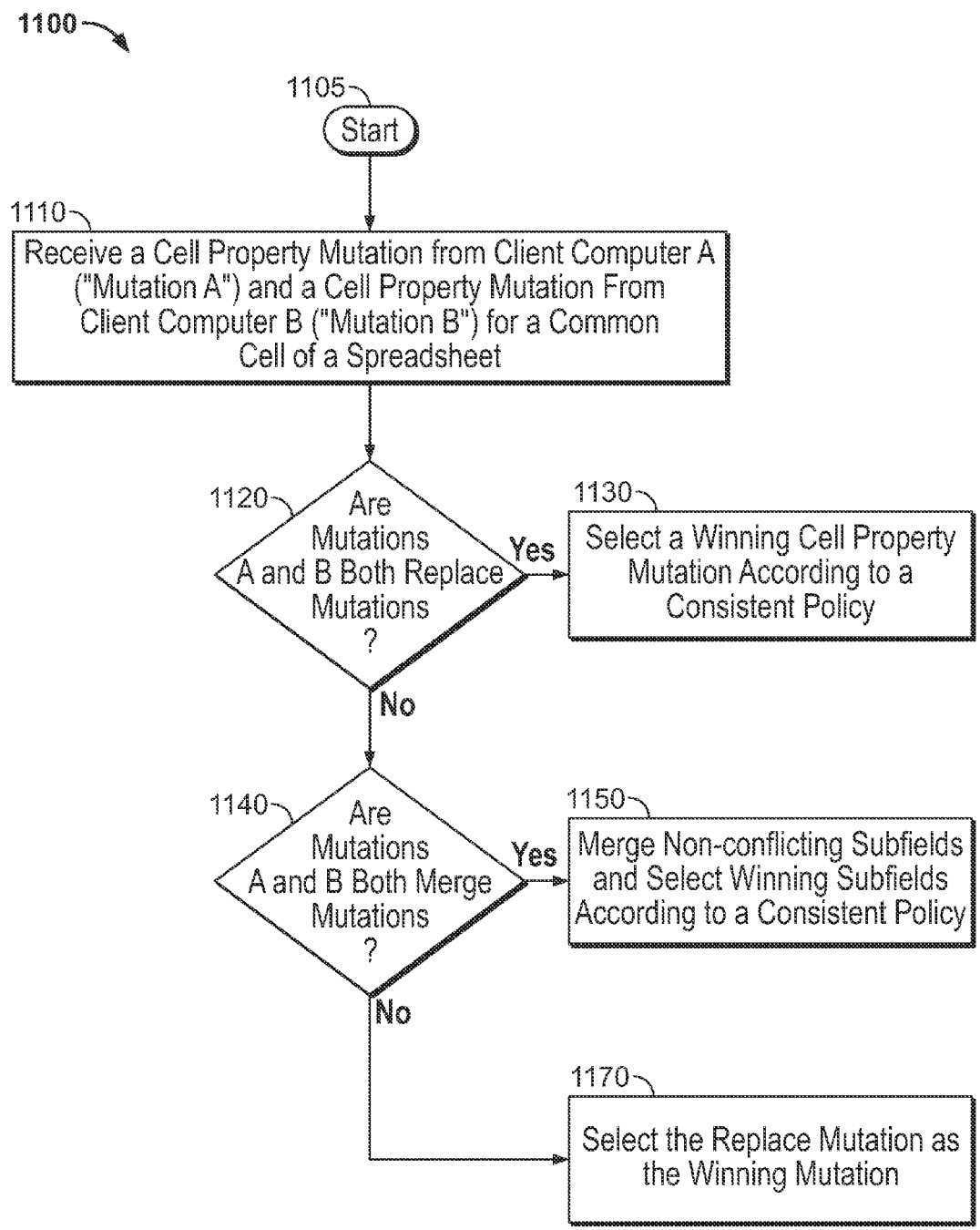
FIG. 11 illustrates an operational transform process by which cell property mutations entered by two collaborators to a common spreadsheet may be resolved in accordance with an implementation.

As mentioned above, cell property mutations entered by two collaborators to a common spreadsheet may conflict. Accordingly, process 1100 of FIG. 11 illustrates an operational transform process by which cell property mutations entered by two collaborators of a common spreadsheet are resolved in accordance with an implementation. The process 1100 starts at 1105. At 1110, a cell property mutation is received from each of a client computer of collaborator A (this mutation will be referred to as "mutation A") and a client computer of a collaborator B (this mutation will be referred to as "mutation B") that affects a common cell of a spreadsheet. At 1120, it is determined if both mutation A and mutation B are replace mutations. If both of the mutations received at 1110 originate from cut-and-paste operations, then both of the cell property mutations are replacement mutations. In this case, process 1100 proceeds to 1130. At 1130, one of mutation A and mutation B is selected as a winning mutation, i.e., the mutation that is to be applied to the exclusion of the other mutation. The winning mutation may be selected by an arbitrary policy, but must be consistently applied at the server and at each client computer. For example, according to one implementation, the winning mutation is selected as the mutation between mutation A and mutation B that arrived at the server first. If, on the other hand, the condition of 1120 is not satisfied, then the process 1100 continues to 1140.

At 1140, it is determined if both mutation A and mutation B are merge mutations. If so, process 1100 proceeds to 1150. At 1150, the conflict between mutation A and mutation B is resolved by merging non-conflicting subfields of mutation A and mutation B and selecting a winning subfield of mutation A and mutation B for any conflicting subfields. In particular, a winning subfield among conflicting subfields of mutation A and mutation B may be selected by an arbitrary policy, but must be consistently applied at the server and at each client computer.

As an example of a case where the subfields of mutation A and mutation B do not conflict, suppose that mutation A is a change to a background color of a cell, i.e., cell_properties.format.background=< . . . >, and mutation B is a change to a foreground color of the cell, i.e., cell_properties.format.foreground=< . . . >. In this case, the subfields are merged to produce the mutation
    cell_properties.format.{
      background=< . . . >,
      foreground=< . . . >}.
As an example of a case where mutation A and mutation B each include a conflicting subfield, consider the case where mutation A and B each specify (conflicting) edits of a background color subfield of a cell, e.g., mutation A specifies cell_properties.format.background=<color<type:RGB rgb:0000CD>> and mutation B specifies cell_properties.format.background=<color<type:RGB rgb:ADD8E6>>. In this case, one of these subfields is selected as the winning subfield. Again, the winning subfield may be selected by an arbitrary policy, but must be consistently applied.

If, on the other hand, the condition of 1140 is not satisfied, this means that one of mutation A and B is a merge mutation and the other is a replace mutation. In this case, the process 1100 proceeds to 1170. At 1170, the replace mutation is selected as the winning mutation over the merge mutation.

It will be apparent to one of ordinary skill in the art, based on the disclosure and teachings herein, that aspects of the disclosed techniques, as described above, may be implemented in many different forms of software, firmware, and hardware in the implementations illustrated in the figures. The actual software code or specialized control hardware used to implement aspects consistent with the principles of the disclosed techniques are not limiting. Thus, the operation and behavior of the aspects of the disclosed techniques were described without reference to the specific software code—it being understood that one of ordinary skill in the art would be able to design software and control hardware to implement the aspects based on the description herein.

What is claimed is:

1. A method for updating a spreadsheet based on user inputs, the method comprising:
receiving a first mutation of a first priority from a source location specifying a function to be applied to data of the spreadsheet, the first mutation comprising (1) a selection of one or more cells at the source location and (2) a mapping from the source location to a destination location;
receiving a second mutation of a second priority from a portion of the source location specifying a data edit mutation to be applied to the spreadsheet, wherein the second mutation is received after the selection of the one or more cells at the source location and before the mapping from the source location to the destination location is received;
determining, by a processor, that the second priority is greater than the first priority;
in response to determining that the second priority is greater than the first priority:
applying the second mutation to the spreadsheet;
performing an operational transform on the selection of the one or more cells of the first mutation based on the second mutation to generate a modified first mutation; and
pasting the modified first mutation to the spreadsheet.

2. The method of claim 1, wherein:
the first mutation corresponds to a cut operation and a paste operation,
the cut operation corresponds to the selection of one or more cells at the source location and the paste operation corresponds to the mapping from the source location to the destination location, and
after the cut operation is received, populating a mutation data structure comprising (1) a value of each cell in the selection of one more cells and (2) the mapping from the source location to the destination location for each cell in the selection of one or more cells.

3. The method of claim 2, wherein applying the modified first mutation to the spreadsheet further comprises:
setting values of destination cells of the spreadsheet in the paste operation,
clearing values of source cells of the spreadsheet in the cut operation, and
updating one or more formulas in the spreadsheet that reference source cell locations in the spreadsheet, upon receiving the data edit mutation between the cut operation and the paste operation.

4. The method of claim 3, wherein updating one or more formulas in the spreadsheet that reference source cell locations in the spreadsheet comprises:

identifying a formula associated with a cell of the spreadsheet, receiving the data edit mutation between the cut operation and the paste operation, and updating the formula only if it is determined that the formula references only cells that are included within the source cell locations in the spreadsheet.

5. The method of claim 2, wherein the second mutation corresponds to a command to delete a row within a region of source cells of the cut operation in the spreadsheet, and in response to receiving the second mutation, performing the operational transform comprises omitting contents of the deleted row from the mutation data structure after the cut operation at the source cells before pasting the selection of one or more source cells in a region of destination cells of the paste operation in the spreadsheet.

6. The method of claim 2, wherein the second mutation corresponds to a command to insert a row within a region of destination cells of the paste operation in the spreadsheet, and in response to receiving the second mutation, performing the operational transform comprises preserving a location and content of the inserted row during the paste operation.

7. The method of claim 1, wherein:
the first mutation corresponds to a column sort operation,
the first mutation comprises the mapping from the source location to the destination location for each cell in the selection of one or more cells, and
the first mutation further comprises at least one value of cell data stored in each cell in the selection of one or more cells.

8. The method of claim 7, wherein the first mutation originates at a first client computer and the second mutation originates at a second client computer, and wherein the first mutation and the second mutation are received at a server.

9. The method of claim 8, wherein:
the second client computer is located remotely to the first client computer, and
in response to receiving the data edit mutation, the first client computer performs the operational transform of the first mutation.

10. The method of claim 9, wherein the first client computer performs the operational transform of the first mutation, by reading from a mutation data structure comprising (1) a value of each cell in the selection of one more cells and (2) the mapping from the source location to the destination location for each cell in the selection of one or more source cells without reading from or writing to a chunk of the spreadsheet including a source location of the selection of one or more cells.

11. The method of claim 1, wherein the first priority is determined based on a first type of the first mutation and the second priority is based on a second type of the second mutation.

12. A computing system configured to update a spreadsheet based on user inputs, the computing system comprising:
a network interface configured to:
receive a first mutation of a first priority from a source location specifying a function to be applied to data of the spreadsheet, the first mutation comprising (1) a selection of one or more cells at the source location and (2) a mapping from the source location to a destination location; and
receive a second mutation of a second priority from a portion of the source location specifying a data edit mutation to be applied to the spreadsheet, wherein the second priority is higher than the first priority, and the second mutation is received after the selection of the one or more cells at the source location and before the mapping from the source location to the destination location is received;

a processor configured to:
determine that the second priority is greater than the first priority;
in response to determining that the second priority is greater than the first priority:
apply the second mutation to the spreadsheet;
perform an operational transform on the selection of the one or more cells of the first mutation based on the second mutation to generate a modified first mutation; and
paste the modified first mutation to the spreadsheet.

13. The computing system of claim 12, wherein:
the first mutation corresponds to a cut operation and a paste operation, wherein the cut operation corresponds to the selection of one or more cells at the source location and the paste operation corresponds to the mapping from the source location to the destination location, and
after the cut operation is received, populating a mutation data structure comprising (1) a value of each cell in the selection of one more cells and (2) the mapping from the source location to the destination location for each cell in the selection of one or more cells.

14. The computing system of claim 13, wherein the processor is further configured to apply the modified first mutation to the spreadsheet by:
setting values of destination cells of the spreadsheet in the paste operation,
clearing values of source cells of the spreadsheet in the cut operation, and
updating one or more formulas in the spreadsheet that reference source cell locations in the spreadsheet, upon receiving the data edit mutation between the cut operation and the paste operation.

15. The computing system of claim 14, wherein the processor is further configured to update one or more formulas in the spreadsheet that reference source cell locations in the spreadsheet by:
identifying a formula associated with a cell of the spreadsheet,
receiving the data edit mutation between the cut operation and the paste operation, and
updating the formula only if it is determined that the formula references only cells that are included within the source cell locations in the spreadsheet.

16. The computing system of claim 13, wherein the second mutation corresponds to a command to delete a row within a region of source cells of the cut operation in the spreadsheet, and in response to receiving the second mutation, performing the operational transform comprises omitting contents of the deleted row from the mutation data structure after the cut operation at the source cells before pasting the selection of one or more source cells in a region of destination cells of the paste operation in the spreadsheet.

17. The computing system of claim 13, wherein the second mutation corresponds to a command to insert a row within a region of destination cells of the paste operation in the spreadsheet, and in response to receiving the second mutation performing the operational transform comprises preserving a location and content of the inserted row during the paste operation.

18. The computing system of claim 12, wherein:
the first mutation corresponds to a column sort operation,
the first mutation comprises the mapping from the source location to the destination location for each cell in the selection of one or more cells, and the first mutation further comprises at least one value of cell data stored in each cell in the selection of one or more cells.

19. The computing system of claim 18, wherein the first mutation originates at a first client computer and the second mutation originates at a second client computer, and wherein the first mutation and the second mutation are received at a server.

20. The computing system of claim 18, wherein:
the second client computer is located remotely to the first client computer, and
in response to receiving the data edit mutation, the first client computer is configured to perform the operational transform of the first mutation.

21. The computing system of claim 20, wherein the first client computer is configured to perform the operational transform of the first mutation, by reading from a mutation data structure comprising (1) a value of each cell in the selection of one more cells and (2) the mapping from the source location to the destination location for each cell in the selection of one or more cells without reading from or writing to a chunk of the spreadsheet including a source location of the selection of one or more cells.

22. The computing system of claim 12, wherein the first priority is determined based on a first type of the first mutation and the second priority is based on a second type of the second mutation.

* * * * *